United States Patent [19]

Urshan

[11] Patent Number: 5,293,032
[45] Date of Patent: Mar. 8, 1994

[54] DIGITAL DATA OPTICAL RECORDING AND PLAYBACK SYSTEM

[76] Inventor: Sydney Urshan, 3151 Cahuenga Blvd., West, Suite 300, Los Angeles, Calif. 90068

[21] Appl. No.: 845,331

[22] Filed: Feb. 10, 1992

[51] Int. Cl.$^5$ .................. G06K 7/10; G06K 19/00
[52] U.S. Cl. .................. 235/454; 235/487; 235/436
[58] Field of Search ........... 235/454, 487, 494, 468, 235/486, 436, 437, 438, 439, 440; 372/24, 29; 369/44.37

[56] References Cited

U.S. PATENT DOCUMENTS

| | | | |
|---|---|---|---|
| 4,701,674 | 10/1987 | Oono et al. | 235/454 |
| 4,730,293 | 3/1988 | Pierce et al. | 235/454 |
| 4,764,931 | 8/1988 | Matsuda | 372/50 |
| 4,852,075 | 7/1989 | Feyrer et al. | 369/100 |
| 4,901,325 | 2/1990 | Kato et al. | 372/44 |
| 5,128,919 | 7/1992 | Narahara et al. | 369/44.37 |

FOREIGN PATENT DOCUMENTS

| | | | |
|---|---|---|---|
| 0115186 | 6/1986 | Japan | 235/487 |
| 0097085 | 5/1987 | Japan | 235/487 |
| 0145792 | 6/1989 | Japan | 235/454 |
| 1251444 | 10/1989 | Japan | 235/454 |

Primary Examiner—Donald Hajec
Assistant Examiner—Esther Chin

[57] ABSTRACT

A digital data recording and playback system which includes an optical recording and playback head for recording and reproducing digital data onto and from a stationary optical storage card. The head contains a multiplicity of miniature laser cells mounted in rows and columns and directed to a surface of the stationary optical storage card. The head may be operated in any one of three modes, namely a record mode in which data is recorded on the card; a playback mode in which data recorded on the card is reproduced; and an erase mode in which data recorded on the card is completely or partially erased.

7 Claims, 5 Drawing Sheets

Optical Laser Head
(side view)

DIGITAL DATA OPTICAL RECORDING AND PLAYBACK SYSTEM

BACKGROUND OF THE INVENTION

The present invention is concerned with a digital data recording and playback system which includes an optical recording and playback head, and which is capable of recording and retrieving digital data representing digital or analog signals onto and from a stationary optical storage card at random access memory speeds.

The system and head of the invention finds particular utility in the system described in co-pending application Ser. No. 619,098 filed Nov. 28, 1990, in the name of the present inventor.

The co-pending application discloses a digital broadcast system for the transmission of production quality stereo audio program material, video program material, and other data. The system described in the co-pending application comprises a plurality of transceiver units, each capable of operating in a number of modes, that is, in recording, transmitting, receiving and playback modes.

In the transmitting mode, one of the transceiver units in the system of the Co-Pending Application is capable of transmitting video or stereo audio data in digital form, either in real time or at high speeds, to other transceiver units over a selected common channel, such as a fiber optic, cellular UHF wave, microwave, satellite wave. In the receiving mode, the transceiver unit is capable of receiving data from the other units of the system of the Co-Pending Application in digital form, and of converting the received data back to its original analog form.

The optical storage card which is used in conjunction with the system and optical recording and playback head of the present invention is an optically encoded data card which may be of a size, for example, of a usual credit card. Both sides of the card may be utilized, and the card may have the capability of storing approximately a one half gigabyte of digital data on each side, which is the equivalent of approximately one double-sided record album per side, without compression of data.

Unlike the usual prior art video or compact disc, the optical storage card used in conjunction with the optical recording and playback head of the invention does not spin or move; and the elimination of the mechanical drive, and other requirements, results in significant accelerated write and access speeds and a cost reduction.

In the practice of the invention, the optical storage card is inserted into a slot in the housing of the optical recording and playback head, is precisely seated in the slot, and is scanned by alternating laser beams. The card itself is not susceptible to damage by normal handling, and it may be carried in a wallet or purse.

SUMMARY OF THE INVENTION

A digital optical recording and playback system is provided which stores and retrieves high resolution digital data signals to and from a stationary digital optical data card, the digital data signals having been converted, for example, from two channels of audio stereo data and/or video data. The system includes a combined write, read and erase optical laser head, which includes a plurality of miniature laser cells arranged in rows and columns. The laser cells are directed to the stationary card. In the write or record mode, data may be stored on the card for future playback. In the read or playback mode, the data previously stored on the card may be retrieved so that the data may, for example, be converted back to the original analog data. In the erase mode, some or all of the data stored on the card may be cleared for new data. The erase mode may be used in conjunction with the record mode.

BRIEF DESCRIPTION OF A PREFERRED EMBODIMENT

DETAILED DESCRIPTION OF THE ILLUSTRATED EMBODIMENT

Figure 1:
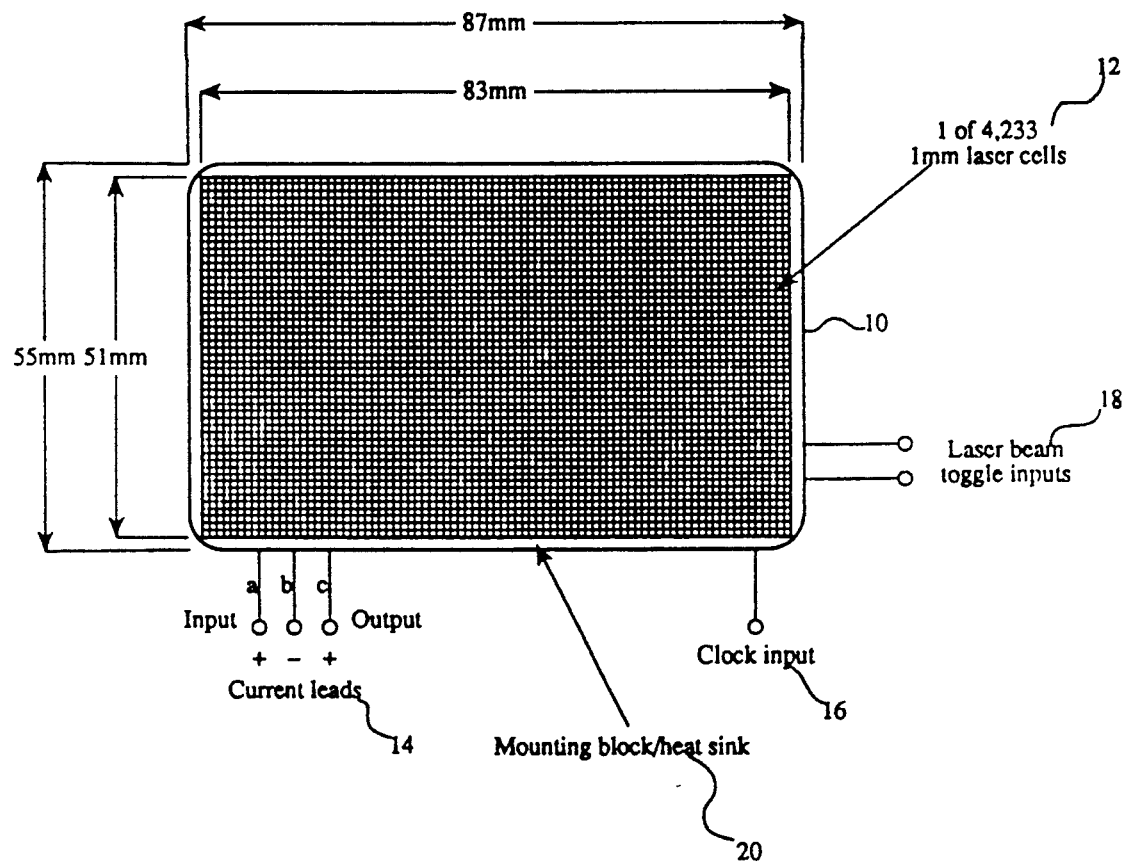
FIG. 1 is a bottom view of an optical laser recording and playback head constructed to incorporate the concepts of the present invention in one of its embodiments.
Figure 2:
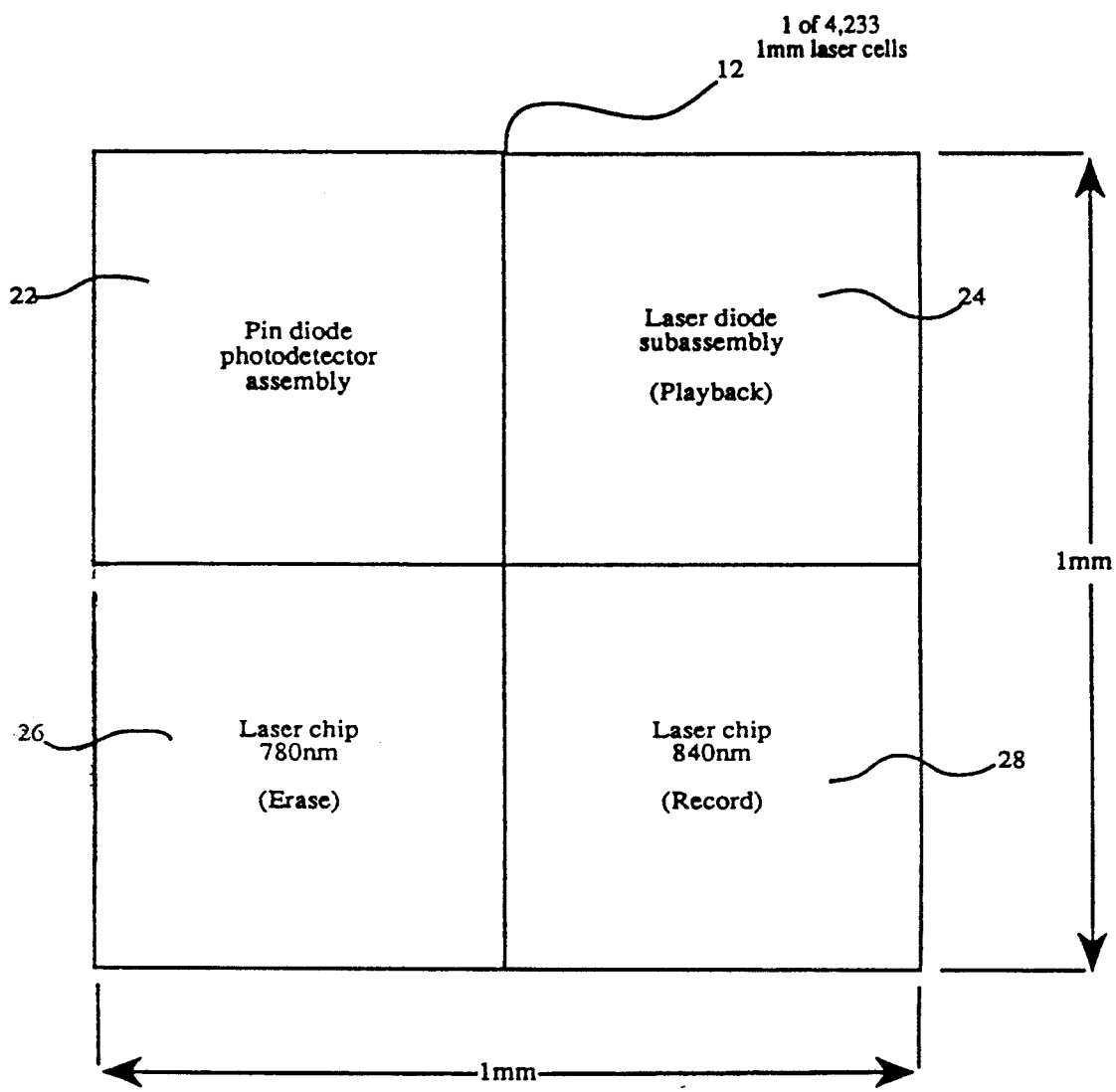
FIG. 2 is a schematic diagram on an enlarged scale of one of a multiplicity of laser cells which are incorporated into the head of FIG. 1.

FIG. 1 is a view of an optical laser recording and playback head 10 constructed in accordance with one embodiment of the invention and illustrating the bottom of the head which is directed towards the optical storage card. The head 10 contains, for example, 4233 individual laser cells 12 arranged in rows and columns. One such cell is shown on an enlarged scale in the schematic diagram of FIG. 2. As shown in FIG. 2, each cell 12 contains three independent laser chips, namely, a playback laser diode sub-assembly 24; a near-infrared (840 nanometer) record laser chip 28; and a near-infrared (780 nm) erase laser chip 26. Each cell also contains a pin diode photo detector assembly 22 which operates in conjunction with the laser diode assembly 24 to detect reflections from the storage card during playback or retrieval of data. Each cell 12 may, for example, be 1 mm by 1 mm providing a ¼ mm by ¼ mm area for each laser chip and photo detector.

Figure 3:
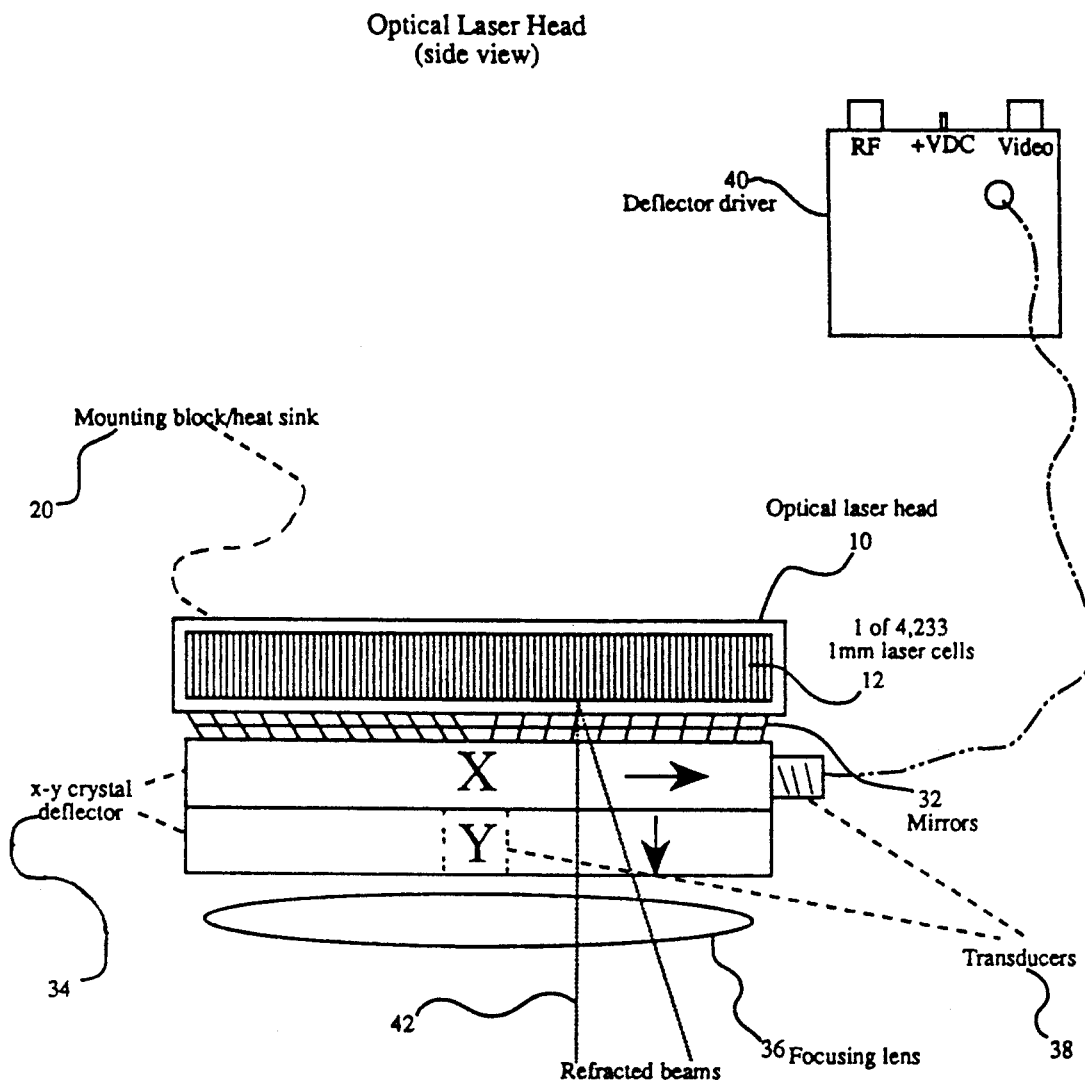
FIG. 3 is a schematic side view of the optical laser head of FIG. 1, and also includes a block representation of a deflector driver for the head.

FIG. 3 is a side schematic view of head 10 and of certain external optics and other equipment associated with the head. Each of the multiplicity of laser cells 12 (FIG. 1) which make up head 10 is directed at a different area on a stationary optical storage card 60 (shown in FIGS. 5 and 6), when the card is inserted into the slot in the housing of the head assembly.

As shown schematically in FIG. 3, an X-Y crystal deflector 34 is provided in the head assembly, and a multiplicity of mirrors 32 are also provided to direct the beams from each of the three (3) laser chips (FIG. 2) of each cell 12 to a different spot on deflector 34 corresponding to that particular cell. For that purpose three mirrors 32 are required for each cell 12. Therefore, each cell 12 is directed to a different spot on the surface of deflector 34. Each mirror 32 may be ¼ mm square.

The X-Y crystal deflector 34 is made up of a multiplicity of refraction elements, each refraction element being small enough to enable the adjacent beams (erase, record and playback) from its corresponding cell 12 to be aimed through it for refraction by the refraction elements 34. The beams of each cell of the cells 12 which make up head 10 are directed through the deflector 34 one cell at a time, and one beam from each cell at a time (erase, record or playback).

The X-Y crystal deflector 34 is driven by a deflector driver 40, as shown in block form in FIG. 3. The deflector 34 may be optimally oscillated by driver 40 at 80 MHz. The deflector 34 causes each beam from each cell 12 of head 10 to be moved, for example, back and forth over 1000 spots on the optical storage card 60 of FIG. 5 in the X direction, and back and forth over 1000 spots on the card in the Y direction. Accordingly, each beam from each cell 12 of head 10 is caused to scan over a different area of 1,000,000 spots on card 60 of FIGS. 5 & 6.

The beams from the cells 12 of head 10 are focused for accuracy by focusing lenses 36, with one lens 36 being provided for each cell 12. The record, erase and playback beams of each cell are directed to the same spot on the corresponding lens 36 by the corresponding mirror 32 and corresponding refracting element of X-Y deflector 36.

The laser cells 12 of head 10 are activated in sequence, and as each cell is activated its scans 1000×1000 spots on its designated area on the face of optical storage card 60 and the beam is then deactivated. This procedure is followed for each of the three (3) functions, namely, record, playback and erase.

The activation and deactivation of each cell is under the control of a clock pulse applied to a clock input terminal 16 (FIG. 1). Each pulse introduced to the head 10 deactivates one of the cells 12 and activates an adjacent cell. In the interval between each clock pulse, deflector driver 40 (FIG. 3) activates a transducer 38 connected to deflector 34. The transducer 38 drives a Y portion of the deflector 34 across 1000 spots in the area of the optical storage card 60 corresponding to the activated cell, and the transducer drives an X portion of the deflector slowly to bring the beam of the activated cell down one line at a time.

The beam from the activated cell 12 accordingly is scanned one line in the Y direction (FIG. 5), shifted down one line in the X direction, and scanned back along the next line in the Y direction. The scanning continues until all 1,000,000 spots on the area of the optical storage card 60 corresponding to the particular cell have been scanned. The scanning is carried out by the selected record, erase or playback beam of the activated cell. The selection from one beam to another for each cell is achieved by toggle input signals applied to input terminals 18 of FIG. 1.

During the recording mode, the laser beams from the cells 12 are modulated with digital information to be recorded on the optical storage card 60. During playback the beams are modulated with digital data stored in the card. During the playback mode, the photo detector 22 of each cell is activated simultaneously with the laser diode cell 24 to detect the digital data modulated on the optical beam.

Figure 4:
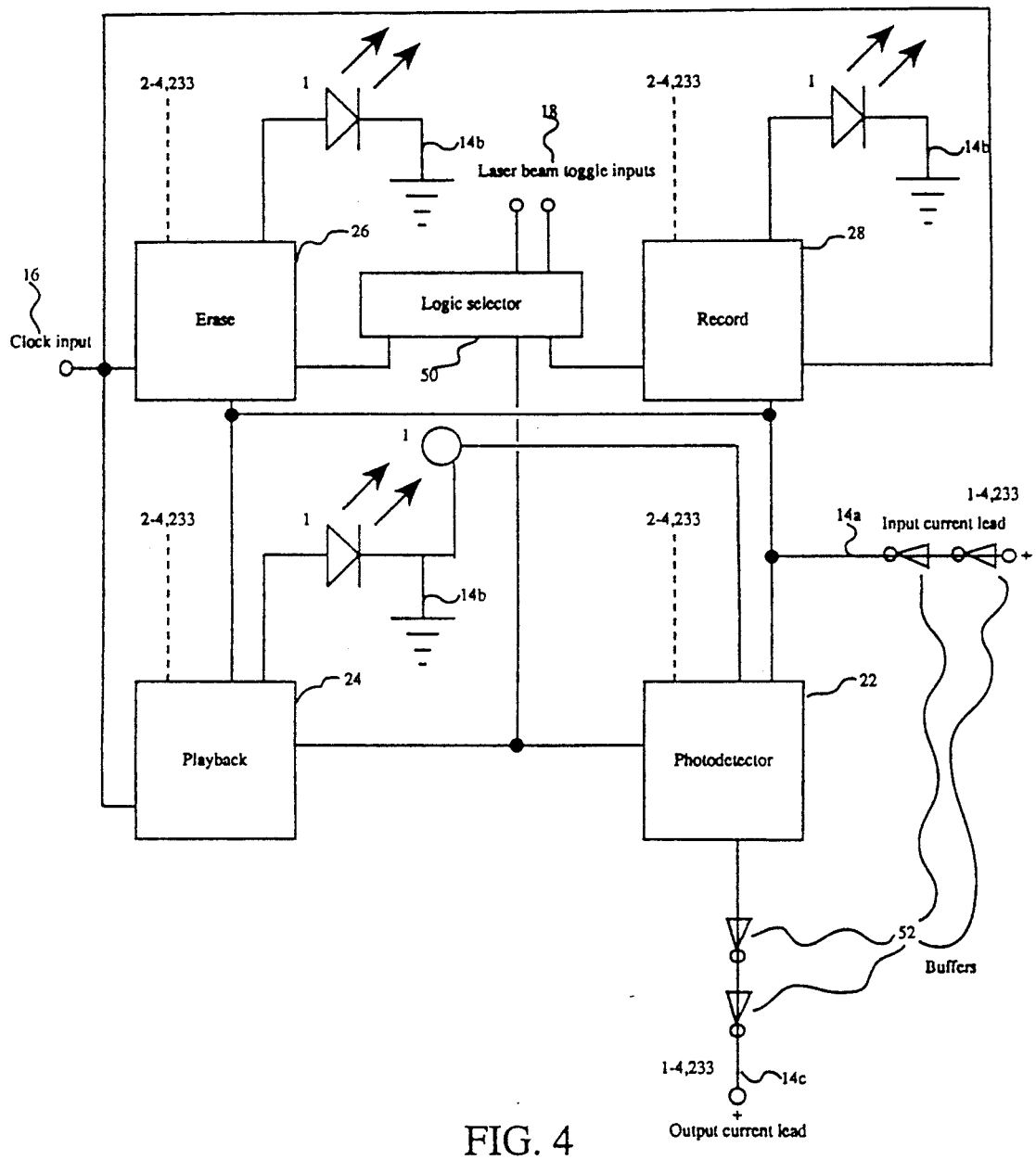
FIG. 4 is a schematic diagram of the optical laser head of FIGS. 1 and 3, and of associated circuitry which make up the illustrated embodiment of the recording and playback system of the invention.

FIG. 4 is a detailed schematic diagram of circuitry incorporated within the housing of the optical laser head 10 described above in conjunction with FIGS. 1, 2 and 3. A constant voltage is applied to the input current lead 14a, and a constant ground is applied to a lead 14b. Clock pulses are applied to clock input 16. Desired binary data is applied to laser beam toggle input terminals 18 to select the erase, record or playback beams for each cell. The logic selector 50 chooses either the erase, record or playback mode beams for each cell depending on the selected input applied at the laser beam toggle input terminals 18.

When the playback mode is selected, photo detector 22 senses laser images from playback laser 24. Serial digital data from each of the cells is provided at output current lead 14c at a selected clock rate through buffers 52. The digital data may be left in its serial form, or it may be converted into 8-,16-, 20-bit (or other) data words by using conventional serial-to-parallel converters and clocking the output accordingly.

Figure 5:
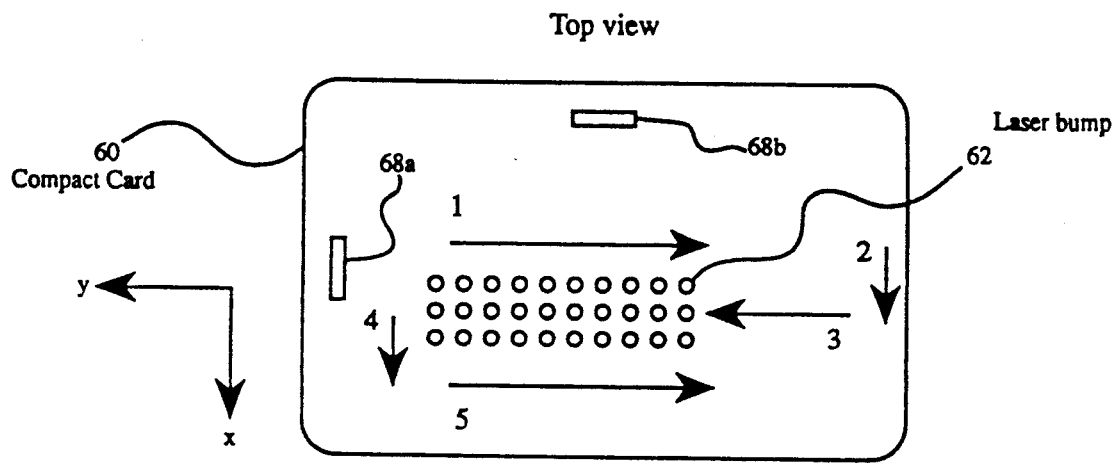
FIG. 5 is a top schematic view of an optical storage card which may be used in conjunction with the head of FIGS. 1 and 3.
Figure 6:
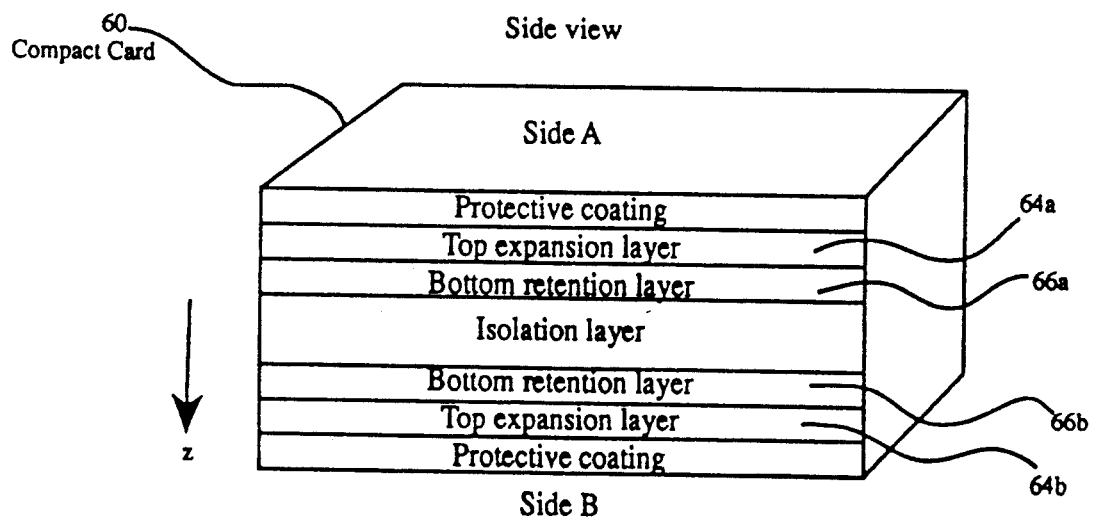
FIG. 6 is a schematic perspective view of the optical storage card of FIG. 5, showing the various layers and coatings which make up the card.

The diagrams of FIGS. 5 and 6 illustrate one embodiment of the optical storage card 60. The card is inserted into a mechanism in the housing of head 10 which pulls the card into a stationary position directly under the optical laser head. First, the card is positioned in the Y direction (see FIG. 5) by aligning an alignment mark 68a on the card with an external sensor until the required tolerance is met. Next, the card is positioned in the X direction (see FIG. 5) by aligning an alignment mark 68b on the card with another external sensor until the required tolerance is met. When the required X-Y positions of card 60 are achieved, the card is aligned in the Z position (see FIG. 6) by reflecting a sensor beam off the inner layer of the card and detecting the beam to calibrate to the required tolerance. The X, Y and Z alignments may be carried out by the use of three precision linear motion motors with leadscrew drives, one for the Y direction, one the X direction, and one for the Z direction. A typical leadscrew drive motor can provide a linear resolution of 0.000004" (approximately 0.1 micron) per step.

The alignment procedures are necessary to position card 60 precisely with respect to the optical laser head 10 regardless of thermal expansion and contraction, or wear and tear that the card may experience from extensive usage. The positioning takes place to align card before laser beams of head 10 are activated.

In the record mode, a 2-bit word is applied to the laser beam toggle inputs 18 (FIGS. 1 and 4). The 2-bit word (11) activates the near-infrared laser chip 28 (FIGS. 2 and 4) used for recording. While in the recording mode, each laser cell scans 1 square millimeter area of storage card. Before each recording chip is activated, the erase laser chip of the cell is activated by a 2-bit word (10) applied to toggle inputs 18, and its beam erases the corresponding area of the card before new data is recorded.

The laser beam from the record mode laser chip scans a line of spots on the face of the target mesh of card 60 in the Y direction 4. After that line has been scanned, the beam is then refracted downwards in a vertical X direction 2 in a step-like fashion to the next line FIG. 5. The beam then scans the next line in the opposite Y direction 3 FIG. 5. The beam scans from line to line, stepping down at the end of each line reversing motion until a complete cell is scanned. A complete cell area may be scanned in about 5 microseconds. At the end of each frame or field, the cell is deactivated and the adjacent cell is then activated recreating the same refractive laser movements. The cells are sequentially activated until all of the cells have been scanned over corresponding areas of card 60 on an individual basis. Scanning may be stopped or started at any point on the card.

In each instance prior data is erased before new data is recorded onto the card by applying the 2-bit word (01) to the laser beam toggle inputs 18, thereby turning on the erase laser chip 26 of each cell before the corresponding record laser chip 28 is activated. Accordingly, existing data is removed from the card with the same refracting pattern described above, before the new data is recorded onto the card. The 2-bit words (01) and (11) are rapidly alternated to erase data immediately before new data is recorded. If only a 2-bit word (01) is present at the laser beam toggle inputs 18, then the erase mode is activated alone.

If a 2-bit word of 00, for example, is present at the laser beam toggle inputs 18, the playback mode activates the semiconductor diode laser subassembly 24 (FIG. 2) and photo detector array 22 sweeping each cell individually alternating from cell to cell for playback of data on the optical storage card 60 in the same fashion as described herein for recording. Cells may be accessed instantly in the playback mode by speeding up the clock at clock input 16 and independently controlling the signals at the x-y crystal deflector transducers 39 to randomly access data at higher speeds. This also applies for finding a particular spot on the card to record onto without erasing pre-existing data. Therefore, data is accessed at speeds comparable to, or faster than current random access memory speeds in sophisticated computers.

The size of a typical optical storage card 60 may be 86 mm×54 mm, for example. The area used for reading and writing on the card may be 83 mm×51 mm, for example. Bumps or spots 62 (FIG. 5) created on card may be 0.5 um in diameter with a distance of 0.5 um between each bump. Therefore, on a surface of 83 mm×51 mm, approximately 4.233 gigabits, or a little over ½ gigabyte may be stored per side of the card.

The optical storage card 60 may be a dye-polymer recording device that utilizes light absorbing dyes which are placed in a by-layer structure (FIG. 6). The two layers, an expansion layer and retention layer are sensitive to different wavelengths. The physical deformation that the polymer layers undergo results in the bumps 62. In this way, data can be written and read. For example, the top expansion layer 64a may be composed of an elastomer containing a dye sensitive to light with an 840-nanometer wavelength light. During recording, infrared laser light of 840-nanometer from laser chip 28 (FIG. 2) is absorbed in the top layer 64a causing its temperature to rise; the bottom layer 66a is transparent to this light. The top layer's heat causes it to expand, pushing the bottom layer to form bump 62 (FIG. 5). When the temperature cools, the bump remains. This formation may be read by the low power laser beam from laser diode subassembly 24 through the lower intensity of the reflected beam, due to scattering. The surrounding flat areas produce a high intensity reflected beam. To overwrite new data, light from the 780 nanometer laser chip 26 is absorbed by the bottom retention layer 66a, but not the top layer 64a. The retention layer 66a is softened, reducing its modules of elasticity. The expansion layer 64a pulls itself back to its original condition, restoring the surface to a flat condition, ready for new data.

Since said lasers 24, 26 and 28 are different wavelengths, the voltage oscillation to the X-Y crystal deflector 34 may need to be compensated to refract different wavelength beams to the same spots on the card.

It will be appreciated that while a particular embodiment of the invention has been shown and described, modifications may be made. It is intended in the following claims to cover all such modifications which come within the true spirit and scope of the invention.

I claim:

1. A digital data recording and playback system including an optical recording and playback head for recording and reproducing data on and from an optical storage card positioned in operative relationship with the head, the head comprising: a plurality of individual miniature laser cells mounted in positions to direct laser beams to a surface of the storage card, with the beams from each of the cells being directed to a different area of the surface of the card; optical means interposed between the cells and the card for directing the laser beams from the cells to respective spots on the surface of the card; and driver means for causing the laser beams from the cells to be scanned over a predetermined number of spots on the surface of the card, in which each of said cells includes at least two independent laser chips for recording and playback modes respectively; and said head including a plurality of elements for directing the laser beams from the two laser chips of each cell to a spot on said optical means corresponding to that cell.

2. The digital data recording and playback system defined in claim 1, and which includes logic circuitry responsive to predetermined input signals for selectively activating the two laser chips on each of said cells; and circuitry responsive to input clock signals for activating and de-activating successive ones of said cells.

3. The digital data recording and playback system defined in claim 2, and which includes input circuitry for introducing digital modulating signals to said cells during the recording mode.

4. The digital data recording and playback system defined in claim 1, in which the laser chips corresponding to the record mode generate laser beams substantially in the 840 nanometer range.

5. The digital data recording and playback system defined in claim 2, and which includes output circuitry for deriving digital signals from said cells during the playback mode.

6. The digital data recording and playback system defined in claim 1, in which said laser cells are mounted in rows and columns, and said driver means causes the laser beams from the cells to be scanned in the X-Y direction.

7. A digital data recording and playback system including an optical recording and playback head for recording and reproducing data on and from an optical storage card positioned in stationary relationship with the head, the head comprising: a plurality of individual miniature laser cells mounted in rows and columns in positions to be directed to a surface of the storage card with each of the cells being directed to a different area on the surface of the card; and X-Y optical deflector means interposed between the cells and the card, for directing the laser beams from the cells to respective spots within different areas on the surface of the card, each area corresponding to a different cell; and driver means coupled to the optical deflector means to oscillate the deflector means and cause the laser beams from the cells to be scanned over a predetermined number of spots in respective ones of the areas of the surface of the card.

* * * * *